UNITED STATES PATENT OFFICE.

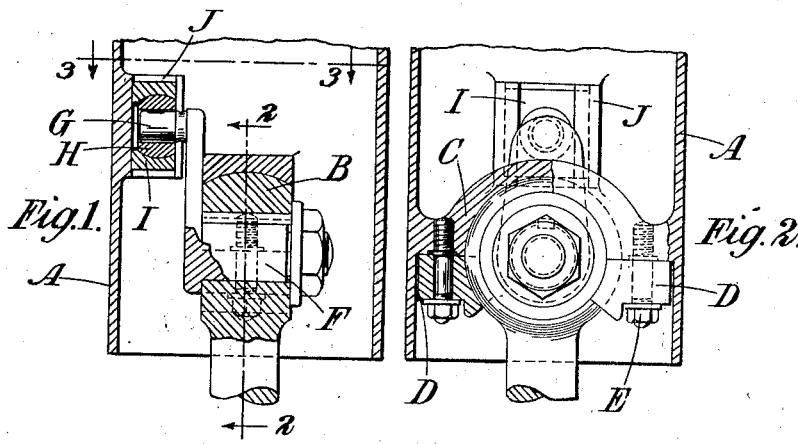
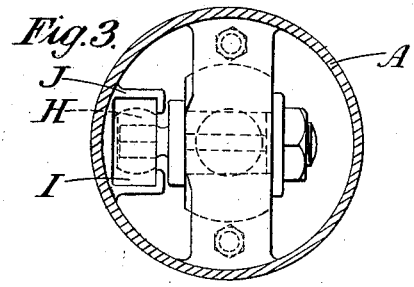
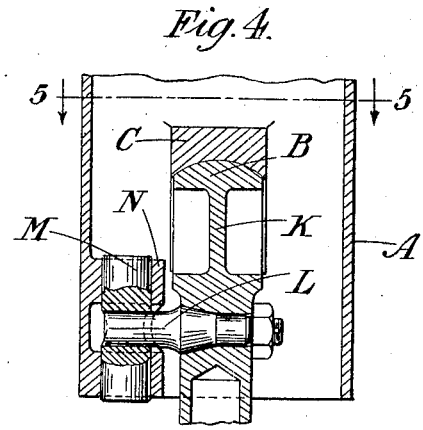
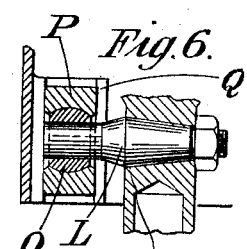
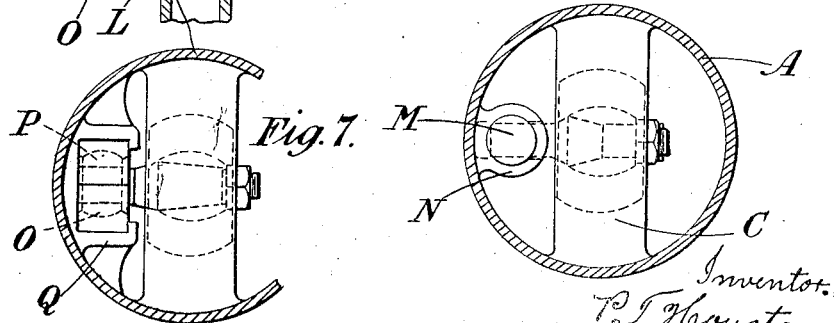

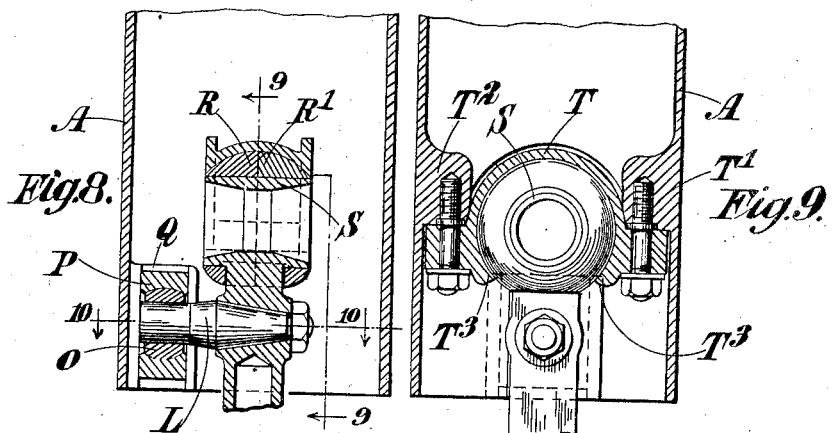
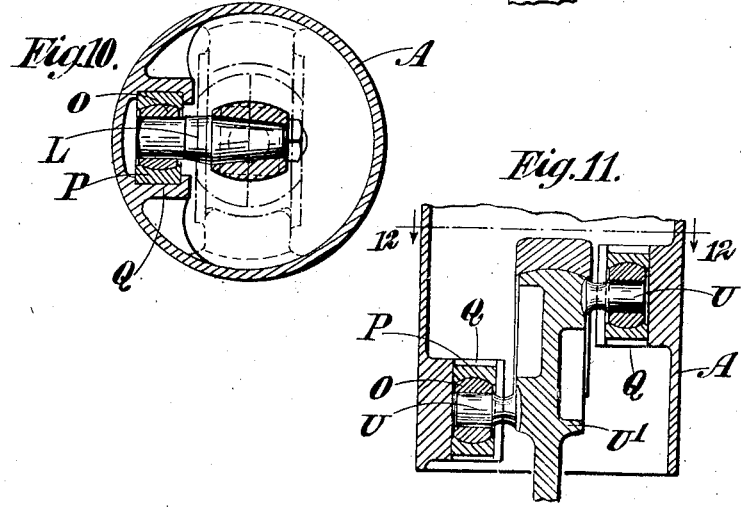
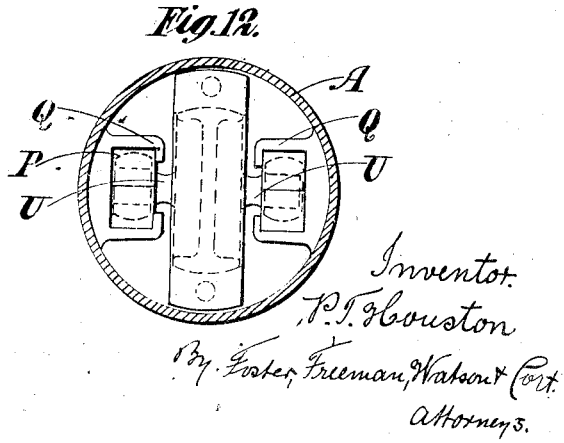

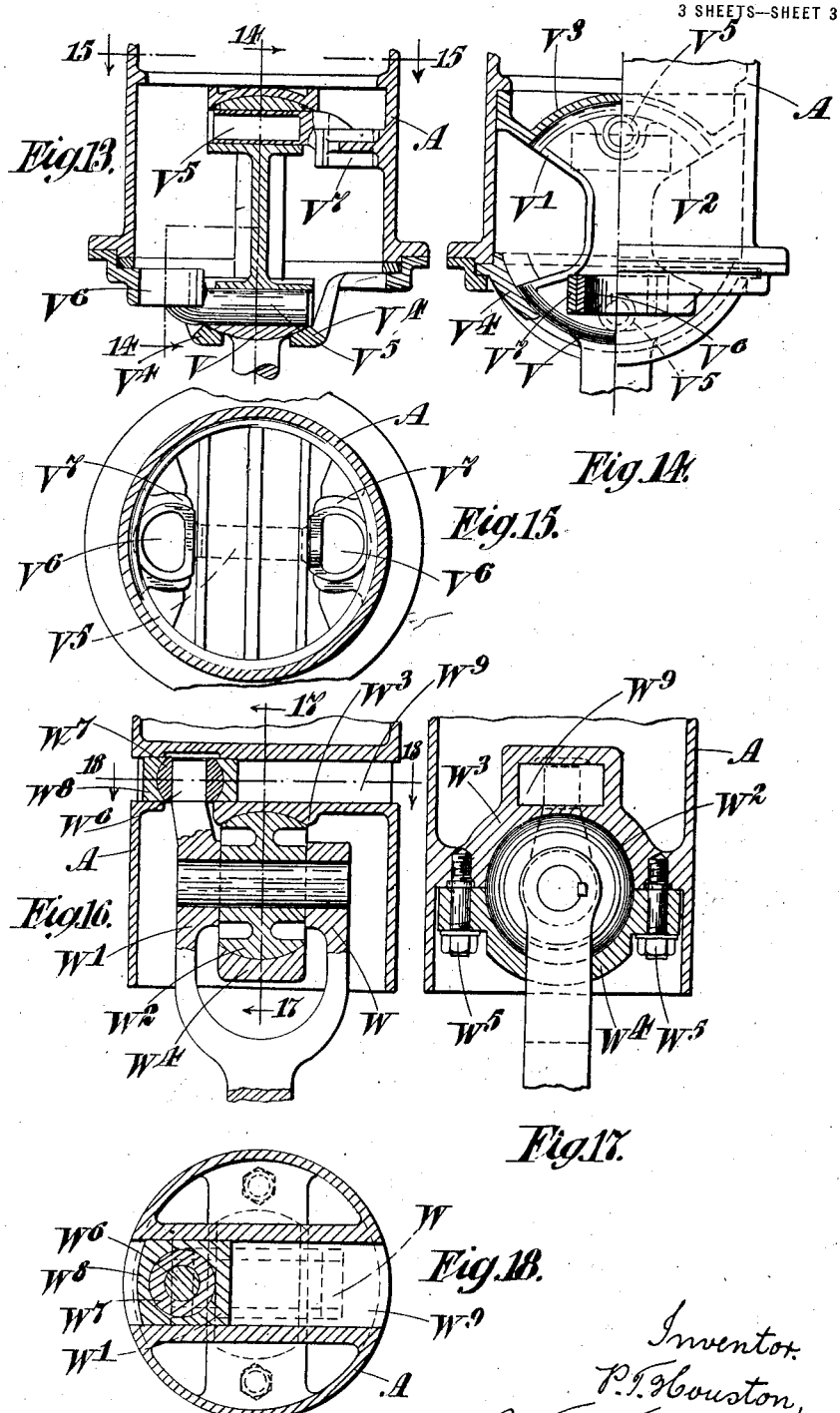

PERCIVAL TURNER HOUSTON, OF LONDON, ENGLAND, ASSIGNOR TO ALPHAERO ENGINES (FOREIGN PATENTS) LIMITED, OF LONDON, ENGLAND.

INTERNAL-COMBUSTION ENGINE.

1,355,744.   Specification of Letters Patent.   Patented Oct. 12, 1920.

Application filed March 25, 1919. Serial No. 285,087.

*To all whom it may concern:*

Be it known that I, PERCIVAL TURNER HOUSTON, a subject of the King of England, residing in London, England, have invented certain new and useful Improvements in Internal-Combustion Engines, of which the following is a specification.

This invention relates to improvements in internal combustion engines of the type in which the working piston uncovers ports in the cylinder by both a to and fro turning movement derived from the oscillation of the connecting rod and a reciprocating movement. In such an engine it has been proposed to mount the bearings for the ends of the gudgeon pin—which connects the small end of the connecting rod to the piston—in such a manner in the piston that although the bearings reciprocate as one with it the piston can turn relatively to the said bearings. The turning movement of the piston was effected by an extension provided on the small end of the connecting rod and operatively connected with the piston.

According to this invention a ball and socket joint between the connecting rod and the piston is combined with an extension on the small end of the connecting rod, which extension couples the rod to the piston through bearings each permitting combined sliding and turning movements. The extension on the small end of the connecting rod can project laterally therefrom and have its end in sliding and turning engagement with a block which has sliding and turning connection both in directions transverse to those of the extension in a pocket formed in the piston.

Several constructions of the piston turning mechanism and the ball connection between the piston and connecting rod are illustrated in the accompanying drawings, in which—

Figure 1 is a vertical section;

Fig. 2 is an elevation partly in section on line 2, 2 in Fig. 1;

Fig. 3 is a cross section on line 3, 3 in Fig. 1;

Fig. 4 is a vertical section of a modification;

Fig. 5 is a cross section on line 5, 5 in Fig. 4;

Figs. 6 and 7 are respectively vertical and cross sections showing a modified arrangement of the connecting rod extension;

Fig. 8 is a vertical section of another modification;

Fig. 9 is an elevation partly in section on line 9, 9 in Fig. 8;

Fig. 10 is a cross section on line 10, 10 in Fig. 8;

Fig. 11 is a vertical section of another modification;

Fig. 12 is a cross section on line 12, 12 in Fig. 11;

Fig. 13 is a vertical section of another modification;

Fig. 14 is an elevation partly in section on line 14, 14 in Fig. 13;

Fig. 15 is a cross section on line 15, 15 in Fig. 13;

Fig. 16 is a vertical section of another modification;

Fig. 17 is a section on line 17, 17 in Fig. 16, and

Fig. 18 is a cross section on line 18, 18 in Fig. 16.

Similar reference letters indicate similar parts in all the figures of the drawings.

Referring to Figs. 1, 2 and 3, A is the piston and B is a connecting rod small end formed as a ball flattened by the removal of portions on two opposite sides. C is a seating solid with the piston, and D are bearing caps which hold up the ball B on to its seating and are connected to the piston by studs and nuts E. A pin F is keyed to the connecting rod and carries a cylindrical extension G projecting laterally from the connecting rod. The extension G has its end in sliding and turning engagement in a block adapted to move in a pocket formed longitudinally in the piston. The block is constituted by a ball H rotatably mounted in a split rectangular bearing I, which can slide in a guide pocket J formed in the piston. Thus the block H, I, has sliding and turning connection, both in directions transverse to those of the extension, in the pocket J.

Figs. 4 and 5 show a construction in which the ball A is recessed on the flattened sides and is provided with a web K. The extension L engages in a cylindrical block M which can both slide and turn in a cylindrical pocket N.

Figs. 6 and 7 show a construction similar to that shown in Figs. 4 and 5 except that the cylindrical block M is replaced by a ball O and a split rectangular bearing P sliding in a rectangular guide pocket Q.

Figs. 8, 9 and 10 show a construction in which the ball on the connecting rod is constituted by two parts R and $R^1$ mounted on a cylinder S the axis of which is at a right angle to that of the connecting rod of which it forms a part. A seating T is bolted to lugs $T^1$ $T^2$ in the piston, and a segment of the seating is removed at $T^3$ for a space in excess of the width of the flattened ball but for considerably less than a semicircle. The flattened ball can be passed edgewise through the gap thus formed into the seating and then turned through an angle of 90° so as to engage the seating and be retained therein. The extension on the connecting rod and the sliding block are similar to those shown in Figs. 6 and 7.

Figs. 11 and 12 show two connecting rod extensions U, one on each side of the flattened ball $U^1$ and each engaging a slide block similar to that shown in Figs. 6 and 7.

Figs. 13 to 15 show a construction in which the ball V is of large diameter relatively to that of the piston, and segments are removed at $V^1$ and $V^2$ so that it can clear the wall of the piston during the rocking movement of the connecting rod. The ball is held up against the seating $V^3$ by gland members $V^4$. The extensions on the connecting rod are constituted by cylindrical pins $V^5$ rotatably and slidably carried in the ball and provided with an enlarged cylindrical portion $V^6$ projecting at a right angle from the pin. This enlarged portion $V^6$ engages rotatably and slidably in a pocket $V^7$ formed longitudinally on the wall of the piston. The flange shown at the bottom of the piston provides an annular pumping face for certain forms of two-stroke engines.

In Figs. 16 to 18 the connecting rod is forked, and the two arms W, $W^1$, of the fork carry rigidly between them a flattened ball $W^2$ which is held up on a seating $W^3$ by a strap $W^4$ passing between the arms of the fork. The strap is connected to the piston by studs and nuts $W^5$. An extension $W^6$ projects from one arm of the fork and fits slidably and rotatably in a hole in a block which comprises a ball $W^7$ mounted in a rectangular bearing $W^8$ which can slide in a rectangular channel $W^9$ formed transversely of the piston.

What I claim as my invention and desire to secure by Letters Patent is:—

1. In an internal combustion engine, in combination, a piston having a projection on its inner wall with an opening therein, a member slidably and rotatably supported in said opening and provided with an aperture intermediate its ends, a connecting rod pivotally connected to the piston, and a pin rigidly secured to the upper end of the connecting rod and extending into the aperture in said member.

2. In an internal combustion engine, in combination, a piston having a projection on its inner wall with an opening therein, a member slidably and rotatably supported in said opening and provided with an aperture intermediate its ends, a connecting rod pivotally connected to the piston, and a pin rigidly secured to the upper end of the connecting rod and having a rotating and sliding fit with the aperture in said member.

3. In an internal combustion engine, in combination, a piston having a projection on its inner wall with a vertically extending cylindrical opening therein, a cylindrical member rotatably and slidably supported in said opening and provided with an aperture intermediate its ends, a connecting rod pivotally connected to the piston and a pin rigidly secured to the upper end of the connecting rod and slidably fitting within the aperture in said member.

4. In an internal combustion engine, in combination, a piston having a projection on its inner wall with a vertically extending cylindrical opening therein, a cylindrical member rotatably and slidably supported in said opening and provided with a horizontally extending aperture intermediate its ends, a connecting rod pivotally connected to the piston and a pin rigidly secured to the upper end of the connecting rod and slidably and rotatably fitting within the aperture in said member.

In testimony whereof I have signed my name to this specification in the presence of a subscribing witness.

PERCIVAL TURNER HOUSTON.

Witness:
E. C. WALKER.